US012694507B2

(12) United States Patent (10) Patent No.: US 12,694,507 B2
Rozeboom et al. (45) Date of Patent: Jul. 28, 2026

(54) INSPECTING MEDICINE OBJECTS BASED ON HYPERSPECTRAL IMAGING

(71) Applicant: PARATA SYSTEMS, LLC, Durham, NC (US)

(72) Inventors: Tiemen Rozeboom, Gorredijk (NL); Dries Johannes Pruimboom, Gorredijk (NL); Ioannis Giotis, Gorredijk (NL)

(73) Assignee: PARATA SYSTEMS, LLC, Durham, NC (US)

( * ) Notice: Subject to any disclaimer, the term of this patent is extended or adjusted under 35 U.S.C. 154(b) by 525 days.

(21) Appl. No.: 18/255,286

(22) PCT Filed: Dec. 3, 2021

(86) PCT No.: PCT/EP2021/084272
§ 371 (c)(1),
(2) Date: May 31, 2023

(87) PCT Pub. No.: WO2022/117874
PCT Pub. Date: Jun. 9, 2022

(65) Prior Publication Data
US 2024/0029237 A1 Jan. 25, 2024

(30) Foreign Application Priority Data

Dec. 3, 2020 (NL) ...................................... 1043858
Dec. 23, 2020 (NL) ...................................... 2027213

(51) Int. Cl.
G06T 7/00 (2017.01)
G06T 7/11 (2017.01)
(52) U.S. Cl.
CPC ................ G06T 7/001 (2013.01); G06T 7/11 (2017.01); *G06T 2207/10024* (2013.01)

(58) Field of Classification Search
CPC . G06T 7/001; G06T 7/11; G06T 2207/10024; G01N 2021/8887; G01N 21/8806; G01N 21/8851; G01N 21/9508
See application file for complete search history.

(56) References Cited

U.S. PATENT DOCUMENTS 7,218,395 B2 5/2007 Kaye et al.
11,551,185 B2 1/2023 Edwards et al.
(Continued)

FOREIGN PATENT DOCUMENTS

CN 102507598 A 6/2012
EP 2853883 A1 4/2015
(Continued)

OTHER PUBLICATIONS

Office Action in corresponding Japanese patent application serial No. 2023-551558 dated Jun. 30, 2025 (5 pages).
(Continued)

*Primary Examiner* — Christopher Wait
(74) *Attorney, Agent, or Firm* — Myers Bigel, P.A.

(57) ABSTRACT

A method of inspecting medicine objects is described, wherein the method comprises: capturing an image of a medicine object; capturing hyperspectral image data of the medicine object; selecting one or more hyperspectral image data parts from the hyperspectral image data based on medicine object localized in the image; determining one or more hyperspectral fingerprints based on the one or more hyperspectral image data parts respectively, a hyperspectral fingerprint being indicative of a spectral response of one or more chemical compounds in a medicine object; and, comparing one of the one or more hyperspectral fingerprints with a reference fingerprint.

20 Claims, 9 Drawing Sheets

(56)                References Cited

U.S. PATENT DOCUMENTS

| | | | |
|---|---|---|---|
| 2002/0109835 | A1 | 8/2002 | Goetz |
| 2007/0008523 | A1 | 1/2007 | Kaye et al. |
| 2014/0319351 | A1 | 10/2014 | Yamada et al. |
| 2018/0091745 | A1 | 3/2018 | Holmes |
| 2019/0110007 | A1 | 4/2019 | Holmes |
| 2020/0221039 | A1 | 7/2020 | Holmes |
| 2020/0333256 | A1 | 10/2020 | Taguchi |
| 2021/0118111 | A1* | 4/2021 | Ti .............................. G06T 5/50 |
| 2021/0274109 | A1 | 9/2021 | Holmes et al. |

FOREIGN PATENT DOCUMENTS

| | | | |
|---|---|---|---|
| EP | 2951563 | A1 | 12/2015 |
| EP | 3299997 | A2 | 3/2018 |
| WO | 0103646 | A2 | 1/2001 |
| WO | 2008034432 | A2 | 3/2008 |

OTHER PUBLICATIONS

International Search Report and Written Opinion for corresponding International application No. PCT/EP2021/084272 dated Mar. 23, 2022.

* cited by examiner

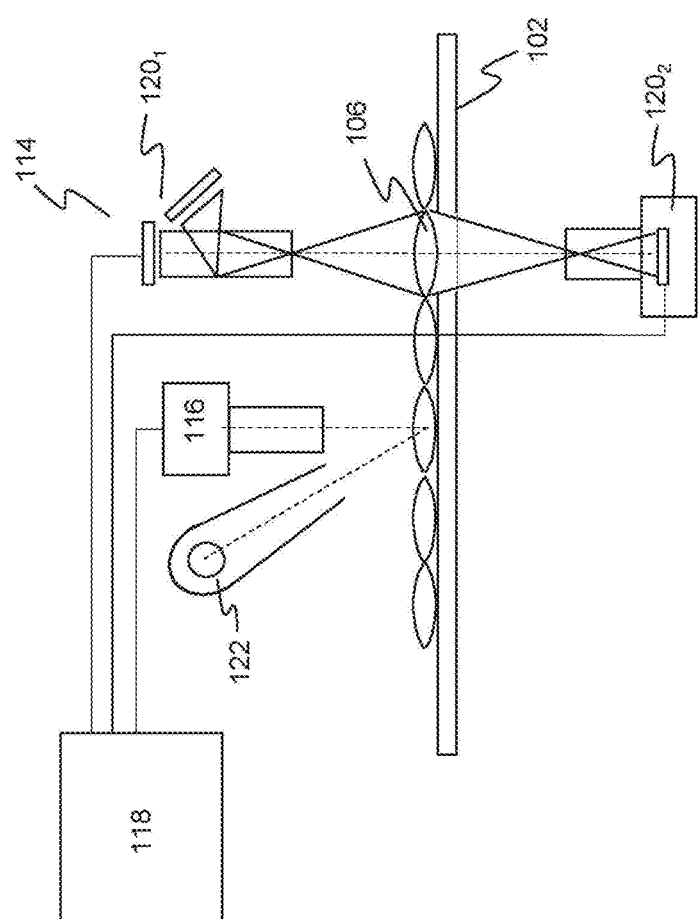
FIG. 1

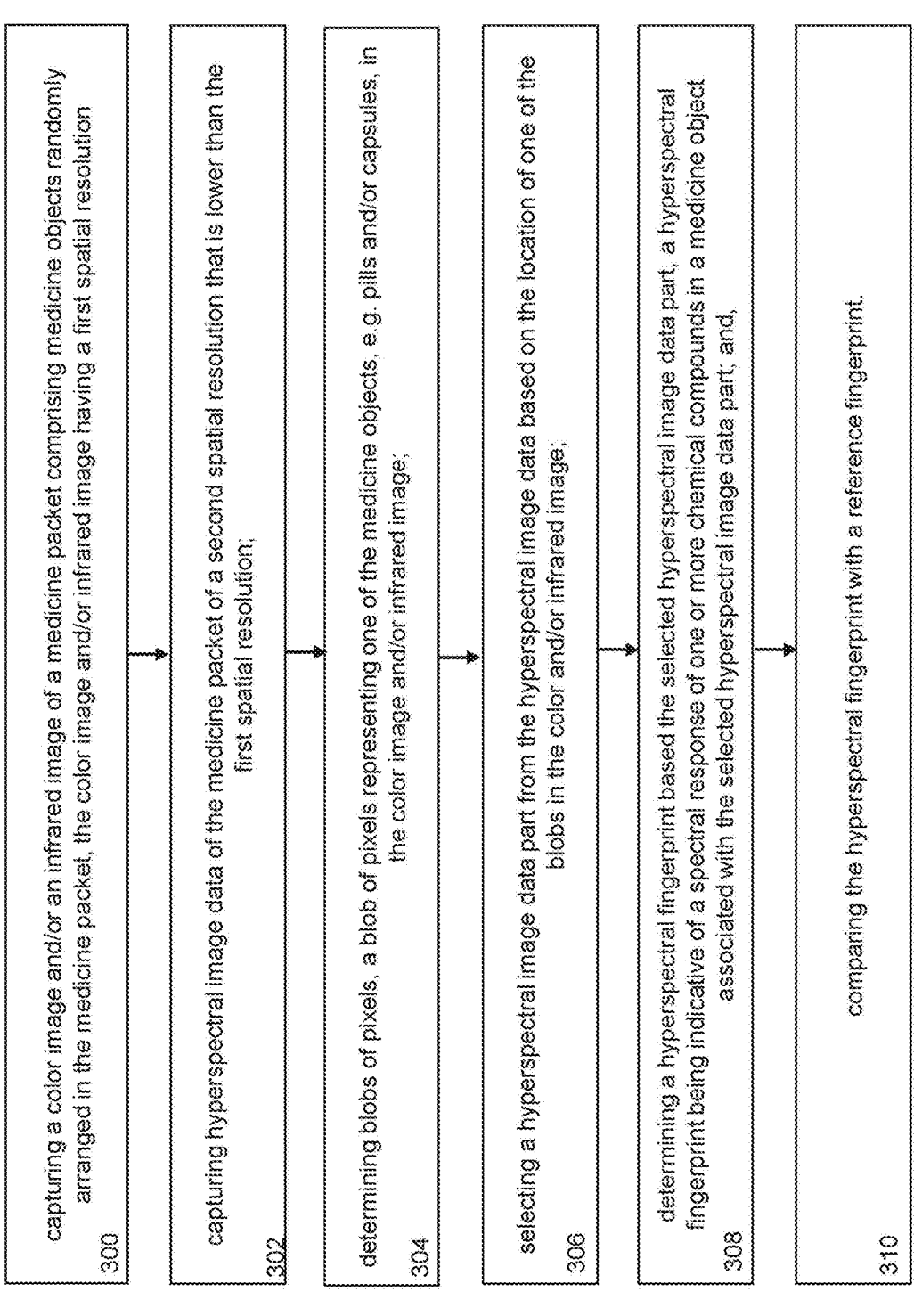

capturing a color image and/or an infrared image of a medicine packet comprising medicine objects randomly arranged in the medicine packet, the color image and/or infrared image having a first spatial resolution

300 capturing hyperspectral image data of the medicine packet of a second spatial resolution that is lower than the first spatial resolution;

302 determining blobs of pixels, a blob of pixels representing one of the medicine objects, e.g. pills and/or capsules, in the color image and/or infrared image;

304 selecting a hyperspectral image data part from the hyperspectral image data based on the location of one of the blobs in the color and/or infrared image;

306 determining a hyperspectral fingerprint based the selected hyperspectral image data part, a hyperspectral fingerprint being indicative of a spectral response of one or more chemical compounds in a medicine object associated with the selected hyperspectral image data part; and,

308 comparing the hyperspectral fingerprint with a reference fingerprint.

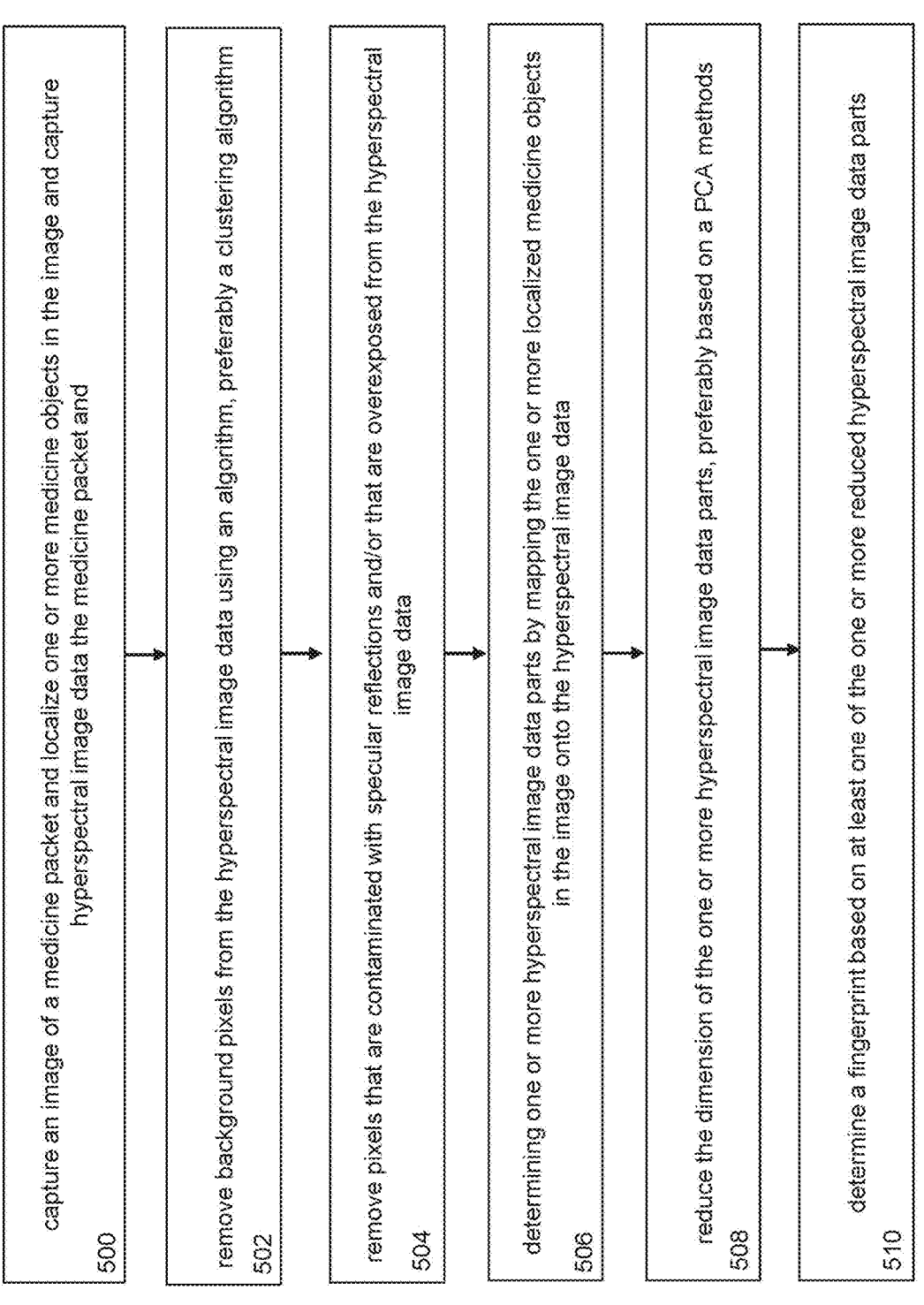

capture an image of a medicine packet and localize one or more medicine objects in the image and capture hyperspectral image data the medicine packet and

500 remove background pixels from the hyperspectral image data using an algorithm, preferably a clustering algorithm

502 remove pixels that are contaminated with specular reflections and/or that are overexposed from the hyperspectral image data

504 determining one or more hyperspectral image data parts by mapping the one or more localized medicine objects in the image onto the hyperspectral image data

506 reduce the dimension of the one or more hyperspectral image data parts, preferably based on a PCA methods

508 determine a fingerprint based on at least one of the one or more reduced hyperspectral image data parts

INSPECTING MEDICINE OBJECTS BASED ON HYPERSPECTRAL IMAGING

CROSS-REFERENCE TO RELATED APPLICATION(S)

The present application is a § 371 national phase entry of International patent application Serial No. PCT/EP2021/ 084272, filed Dec. 3, 2021, and published in English, and claims priority from Netherlands application no. 1043858 filed on Dec. 3, 2020 and Netherlands application no. 2027213 filed on Dec. 23, 2020.

FIELD OF THE INVENTION

The invention relates to inspecting medicine objects, in particular pouches comprising medicaments, based on hyperspectral imaging, and, in particular, though not exclusively, to methods and systems for inspecting medicine objects based on hyperspectral imaging and a computer program product for executing such methods.

BACKGROUND OF THE INVENTION

Patients are provided with medicaments according to a prescription. Especially, people with a chronic disease periodically need to take the same medicines over a long period of time. Often patients need to take a combination of different medicaments, i.e. pills, tablets and/or capsules. To facilitate the prescription for a patient, the medicaments may be packed into pouches, e.g. a transparent plastic pouches, blisters or bags, according to the prescription using an automated packaging system. Incorrect packaging of a prescription may be result in the patient taking the wrong (combination of) medicaments or an incorrect dosage of medicaments, which may be harmful for the health of the patient.

To reduce the failure rate, medicine objects are checked by an inspection system which is configured to inspect medicine objects using an image processing system, wherein medicine objects may represent e.g. pills and/or tablets, capsules, ampules or packets, blisters or pouches comprising medicine objects. An example of such inspection system is known from EP2951563. To extend the functionality of such inspection system, other inspection techniques may be considered. For example, US2014/0319351 describes an example of an inline system for inspecting pills arranged in a blister package, based on near infrared NIR hyperspectral imaging. The inspection system illuminates pills in a blister package with light of a halogen lamp and a hyperspectral image sensor then detects fifteen response values for fifteen bands in the NIR spectrum. The response values are processed to determine parts of the response values belonging to responses of the pills. These parts are then compared to a reference in order to determine if the pills contain the correct composition.

Building an accurate high-throughput inspection system for medicine pouches, e.g. an inspection system capable of inspecting 10.000 pouches per hour or more, that includes hyperspectral analysis capabilities as described above is however challenging for several reasons. In contrast to blister packages wherein pills or capsules of one size, shape and composition are spatially arranged in an orderly fashion, medicine objects in medicine pouches may include different medicine objects of different size, shape and composition which are spatially distributed in a random order. Medicine objects may be arranged on their side, next to each other or (partly) over each other, while the transparent pouch material may introduce errors in the measured data.

Moreover, the NIR response of medicaments is a relatively weak signal because most medicaments largely consist of the same ingredients (coating, binder material, etc.) which often account for a large part of the mass of the pill. Therefore, instead of 15 values as mentioned in the prior art, large numbers, e.g. a few hundred or more, spectral response values per pixel are needed to distinguish different medicaments. In that case, hyperspectral image data typically includes a block of data (a data stack) of a considerable amount of data, e.g. more than 100 Mbyte per picture, that needs to be analyzed in real-time. Methods in the prior art for processing the hyperspectral data of imaged medicament pouches are not suitable for that purpose.

Hence, there is a need in the art for improved methods and systems for inspecting medicine pouches, in particular methods and systems for inspecting medicine pouches based on hyperspectral imaging in the near infrared part of the electromagnetic spectrum, that allows accurate, real-time, high-throughput inspection of medicine pouches.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

The methods, systems, modules, functions and/or algorithms described with reference to the embodiments in this application may be realized in hardware, software, or a combination of hardware and software. The methods, systems, modules, functions and/or algorithms may be realized in a centralized fashion in at least one computing system, or in a distributed fashion where different elements are spread across several interconnected computing systems. Any kind of computing system or other apparatus adapted for carrying out the embodiments (or parts thereof) described in this application is suited. A typical implementation may comprise one or more digital circuits such as application specific integrated circuits (ASICs), one or more field programmable gate arrays (FPGAs), and/or one or more processors (e.g., x86, x64, ARM, PIC, and/or any other suitable processor architecture) and associated supporting circuitry (e.g., storage, DRAM, FLASH, bus interface circuits, etc.). Each discrete ASIC, FPGA, processor, or other circuit may be referred to as "chip," and multiple such circuits may be referred to as a "chipset." In an implementation, the programmable logic devices may be provided with fast RAM, in particular block RAM (BRAM). Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure.

The flowcharts and block diagrams in the figures may represent architecture, functionality, and operation of possible implementations of the methods, systems and/or modules to various embodiments of the present invention. In this regard, each block in a flowchart or a block diagrams may represent a module, segment, or portion of code, which may be implemented as software, hardware or a combination of software and hardware.

It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that performs the specified functions or acts, or combinations of special purpose hardware and computer instructions.

It is an aim of the embodiments in this application to provide an efficient and accurate inspection method for medicine packets that contain one or more medical objects, e.g. pills and/or capsules.

In particular, it is an aim of the embodiments in this application to use hyperspectral imaging in a medicine inspection system so that the system is able to distinguish medicine objects that appear the same to the human eye (for example same color and shape) and thus are not distinguishable by analysing image data in the visible spectrum of the medicine object. For accurate medicine object inspection systems, the ability to accurately distinguish medications based on the substances (composition) is very important, since a very large number of medications are not visually distinct (very often round, white tablets).

Technical advantages of hyperspectral imaging may include the high spectral resolution (>200 bands instead of the three conventional color bands with RGB multispectral imaging), which allows detection of differences in otherwise similar objects in the visible spectrum. Additionally, it allows recognizing different medications based on the non-visible part (the near infrared part) of the electromagnetic spectrum.

In an aspect, the invention may relate to a method for inspecting medicine objects comprising: capturing an image of medicine objects, preferably medicaments of different shapes, sizes and/or compositions, randomly arranged in a pouch, the image having a first spatial resolution; capturing hyperspectral image data of the medicine objects in the pouch, the hyperspectral image data having a second spatial resolution smaller than the first spatial resolution; determining blobs of pixels in the image of the first spatial resolution, each of the blobs of pixels representing one of the medicine objects; selecting at least one hyperspectral image data part from the hyperspectral image data based on at least one of the blobs of pixels in the image of the first spatial resolution; determining a hyperspectral fingerprint based on the hyperspectral image data part, the hyperspectral fingerprint being indicative of a spectral response of one or more chemical compounds in a medicine object; and, comparing the hyperspectral fingerprint with one or more reference fingerprints.

In an embodiment, the capturing of the hyperspectral image data may include exposing the medicine object to light having a continuous spectrum, preferably a continuous spectrum in the visible and/or near-infrared region of the electromagnetic spectrum.

In an embodiment, the hyperspectral data may include pixels, each pixel being associated with a plurality of spectral values, preferably the plurality of spectral values including spectral values in the visible and/or the near-infrared region of the electromagnetic spectrum.

In an embodiment, the one or more single or multi-band images may include a 2D grid of pixels, each pixel being associated with one or a few spectral values, preferably a spectral value selected from one or more spectral values, e.g. RGB values and/or an IR value.

In an embodiment, the hyperspectral image data may include line-scan hyperspectral image data, the line-scan hyperspectral image data including lines of pixels.

In an embodiment, the method may further comprise: localizing one or more groups of pixels associated with one or more medicine objects in the image based on a segmentation algorithm.

In an embodiment, selecting one or more hyperspectral image data parts may include: mapping each of the one or more groups of pixels onto the pixels of the hyperspectral image data.

In an embodiment, prior to the selecting one or more hyperspectral image data parts, one or more of the following steps may be executed: removing background pixels (outliers) from the one or more hyperspectral image data using an algorithm, preferably a clustering algorithm; and, removing pixels that are contaminated with specular reflections and/or that are overexposed from the one or more hyperspectral image data.

In an embodiment, the determining one or more hyperspectral fingerprints may further comprise: reducing the dimension of the one or more hyperspectral image data parts, preferably based on a PCA methods; and, determining a fingerprint based on at least one of the one or more reduced hyperspectral image data parts.

In an embodiment, a camera system is used to capture the one or more single or multi-band images and hyperspectral image data, preferably the camera system including a multispectral camera and, optionally, a single or multi-band camera, such as a monochromatic or a color camera.

In an embodiment, the hyperspectral image data may be captured using a hyperspectral line scan camera, wherein during the capturing, the medicine object moves relative to the hyperspectral line scan camera, more preferably the medicine object moves through the field of view of the camera system.

In another aspect, the invention may relate to a module for controlling a medicine inspection apparatus comprising an camera system, the module comprising a computer readable storage medium having computer readable program code embodied therewith, and a processor, preferably a microprocessor, coupled to the computer readable storage medium, wherein responsive to executing the computer readable program code, the processor is configured to perform executable operations comprising: capturing an image of medicine objects, preferably medicaments of different shapes, sizes and/or compositions, randomly arranged in a pouch, the image having a first spatial resolution; capturing hyperspectral image data of the medicine objects in the pouch, the hyperspectral image data having a second spatial resolution smaller than the first spatial resolution; determining blobs of pixels in the image of the first spatial resolution, each of the blobs of pixels representing one of the medicine objects; selecting at least one hyperspectral image data part from the hyperspectral image data based on at least one of the blobs of pixels in the image of the first spatial resolution; determining a hyperspectral fingerprint based on the hyperspectral image data part, the hyperspectral fingerprint being indicative of a spectral response of one or more chemical compounds in a medicine object; and, comparing the hyperspectral fingerprint with one or more reference fingerprints.

In a further aspect, the invention may relate to a medicine object inspection apparatus comprising: a camera system, and, a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: capturing an image of medicine objects, preferably medicaments of different shapes, sizes and/or compositions, randomly arranged in a pouch, the image having a first spatial resolution; capturing hyperspectral image data of the medicine objects in the pouch, the hyperspectral image data having a second spatial resolution smaller than the first spatial resolution; determining blobs of pixels in the image of the first spatial resolution, each of the blobs of pixels representing one of the medicine objects; selecting at least one hyperspectral image data part from the hyperspectral image a based on at least one of the blobs of pixels in the image of the first spatial resolution; determining a hyperspectral fingerprint based on the hyperspectral image data part, the hyperspectral fingerprint being indicative of a spectral response of one or more chemical compounds in a medicine object; and, comparing the hyperspectral fingerprint with one or more reference fingerprints.

In an embodiment, the hyperspectral data may be determined using a hyperspectral camera which may be configured to detect the spectral response of an imaged area in the near-infrared (NIR) part of the spectrum. In another embodiment, the hyperspectral camera may be configured to detect the spectral response of an imaged area in both the visible and NIR part of the spectrum. In that case, the hyperspectral camera may generate image data both in the visible range and in the NIR range. If the hyperspectral camera is configured to generate both NIR and visible spectral values for each pixel. A separate multispectral camera, e.g. an RGB or RGB/IR camera is no longer needed. In that case, one or more slices of spectral values at one or more wavelengths in the visible spectrum may be taken from the hyperspectral data stack. Hence, in this embodiment, a single or multi color image may be derived from the hyperspectral image data. Based on this color image medical objects, e.g. pills, may be detected and located using standard image processing algorithms.

In an embodiment, the camera system may include a hyperspectral camera and a lamp for illuminating an imaging area of the hyperspectral camera. In an embodiment, the lamp may include a housing and an illumination source. At one side, the housing may include an aperture allowing light to exit the housing and illuminate a medicine object. Typically, the illumination source may be configured to generate light of a continuous spectrum such as a halogen lamp or the light. Such illumination sources generate a large amount of heat. Therefore, in some embodiments, the housing may include an outlet which may be connected to a cooling system, e.g. an air cooling system. This way, a flow, e.g. an air flow, can be generated wherein heat is transported away from the aperture towards the outlet. This way, it may be avoided that the heat produced by the illumination sources increases the temperature of its surroundings.

The invention may also relate to a method of inspecting medicine objects comprising: capturing a single-band image or a multi-band image of medicine objects, preferably medicaments of different shapes, sizes and/or compositions, randomly arranged in a pouch; capturing hyperspectral image data of the medicine objects in the pouch; determining blobs of pixels in the single-band image or a multi-band image, each of the blobs of pixels representing one of the medicine objects; selecting at least one hyperspectral image data part from the hyperspectral image data based on at least one of the blobs of pixels in the single-band image or a multi-band image; determining a hyperspectral fingerprint based on the hyperspectral image data part, the hyperspectral fingerprint being indicative of a spectral response of one or more chemical compounds in a medicine object; and, comparing the hyperspectral fingerprint with one or more reference fingerprints.

The invention may also relate to a computer program product comprising software code portions configured for, when run in the memory of a computer, executing the method steps according to any of process steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 1 illustrates a medicine object inspection system according to an embodiment of the invention;

FIG. 3 depicts a flow diagram of a method for inspecting medicine packets according to an embodiment of the invention;

FIG. 5 depicts a system for processing hyperspectral imaging data according to an embodiment of the invention;

DETAILED DESCRIPTION

Figure 2:
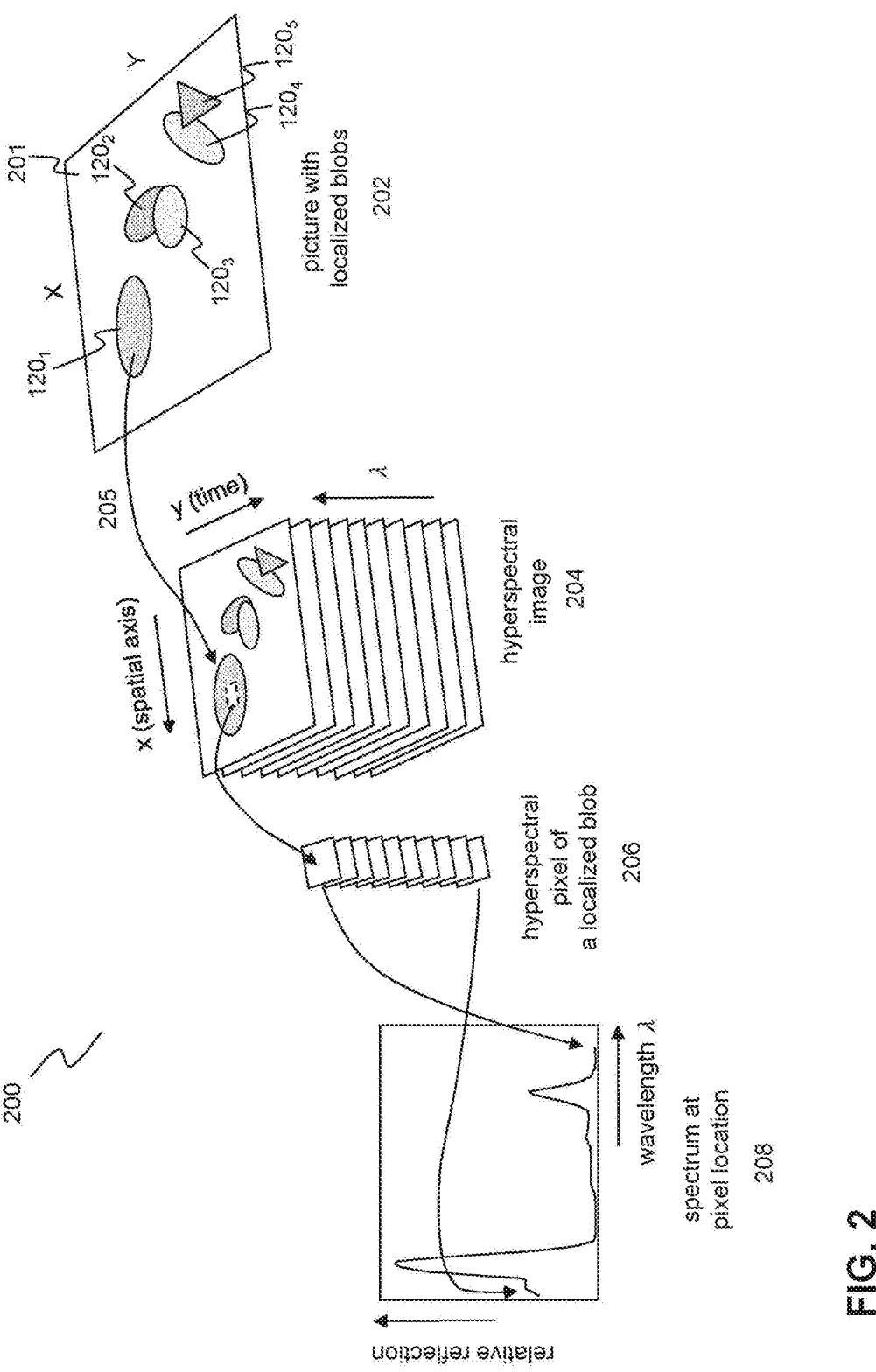
FIG. 2 illustrates a medicine object inspection scheme based on hyperspectral imaging according to an embodiment of the invention.

FIG. 1 illustrates a medicine object inspection system according to an embodiment of the invention. In particular, the figure depicts an inspection system 100, comprising a transporting system 102 for transporting medicine objects 106, including medicine pouches comprising a plurality of different medicine objects, through an inspection area configured to inspect the medicine objects based on an imaging system. The medicine objects may represent e.g. pills and/or tablets, capsules, ampules which may be packaged in packets or pouches and which may be inspected based on an imaging system. In an embodiment, the imaging system may comprise one or more camera systems 114,116.

For example, in an embodiment, a first camera system 114 may comprise one or more image sensors configured to capture images of a first spatial resolution of the medicine objects based a (limited) number of color channels. For example, in an embodiment, an image sensor may include RGB pixels for capturing an RGB color image or an image for each color channel. In a further embodiment, an image sensor may include a spectral channel in the non-visible part of the electromagnetic spectrum, e.g. a channel in the near infrared (NIR). The first spatial resolution may be a high spatial resolution so that details of the medicaments in a pouch, including shape, contour and letters, can be determined very fast and accurately based on known image processing algorithms. In an embodiment, a NIR camera may be used to obtain a high spatial resolution (near) infrared image of the medicaments. Such image provides accurate information of the outer contours of the medicaments in the package. Further, in an embodiment, a color camera may be used to capture high spatial resolution color images of the medicaments Based on these images the location, shape and for example the color of the medicaments in the package may be determined very fast and accurately.

In a further embodiment, a second camera system 116 may comprise a hyperspectral camera system, in particular a hyperspectral camera that may be configured to perform hyperspectral imaging on medicine objects. Pharmaceutically active compounds in the medicine objects are responsive to near infrared radiation, in particular near infrared radiation in the range between 800 and 1700 nm. This way, hyperspectral imaging may be a valuable tool for inspecting medicaments, such as inspecting pharmaceutically active compounds in a in pill, tablet or capsule. Hence, per pixel of the hyperspectral camera, a plurality of spectral values, preferably 100 or more spectral values, may be detected within a predetermined part of the electromagnetic spectrum, for example, the visible band between 400 nm and 800 nm and/or the near infrared NIR band, e.g. between 800 and 1700 nm. This way, the hyperspectral camera may produce a spectral image data stack wherein a slice of the spectral image data stack at a wavelength of the spectrum may represent an image of a second spatial resolution of the package including the medicaments, wherein the second spatial resolution is smaller than the first spatial resolution.

As the NIR part of the EM spectrum is especially suitable to determine responses of pharmaceutically active compounds, a spectral value of the hyperspectral image data stack may represent a spectral response of an medicament captured by the hyperspectral imaging system.

During hyperspectral imaging an object may be illuminated using an illumination source 122 that is especially suitable for hyperspectral imaging. For hyperspectral applications, the illumination source may be selected to have a continuous spectrum in the relevant parts of the spectrum, for example a continuous spectrum in the UV, visible and/or near infrared (NIR) range. Illumination sources that are suitable for this purpose include incandescent light sources, such as halogen lamps, that are based on a high-temperature heated filament.

In another embodiment, the hyperspectral camera may be configured to detect the spectral response of an imaged area in both the visible and NIR part of the spectrum. In that case, the hyperspectral camera may generate image data both in the visible range and in the NIR range. A separate multispectral camera, e.g. an RGB or RGB/IR camera may not be needed if the hyperspectral camera is configured to generate both NIR and visible spectral values for pixels. In that case, one or more slices of spectral values at one or more wavelengths in the visible spectrum may be taken from the hyperspectral data stack. In some embodiments, a single-band image (e.g. a NIR image) or multi-band image (e.g. an RGB or RGBI image) may be derived from the hyperspectral image data. Based on this image, groups of pixels (blobs) representing medical objects, e.g. pills, may be detected and located using standard image processing algorithms.

A computer 118 may control the imaging system and the transport of the medicine objects. Further, the computer may comprise one or more image processing modules configured to process the image data generated by the imaging system so that medicine objects can be reliably inspected. The image processing module may be configured to execute the image processes as described with reference to the embodiments in this application.

FIG. 2 illustrates a scheme for inspecting medicine objects based on hyperspectral imaging according to an embodiment of the invention. In particular, the figure includes a scheme 200, including capturing one or more first images of a first spatial resolution, e.g. one or more RGB and/or IR images, of a medicine pouch 201 comprising medicaments, in this example pills $201_{1-5}$, which may be of different shapes, sizes and compositions and which may be randomly arranged in the pouch. In this case, some of the pills such as pills $201_{2,3}$ and pills $201_{4,5}$ may be arranged partially next or over each other. The one or more first images may be used to localize the pills in the image of a first spatial resolution based on known object detection and segmentation algorithms. This way the medicaments $201_{1-5}$ in the image may represent groups of pixels (blobs) in the image (step 202). Further, the medicine pouch may be imaged by a hyperspectral camera to create hyperspectral image data, a hyperspectral image data stack, of a second spatial resolution which is lower than the spatial resolution of the one or more first images.

The hyperspectral camera may be implemented in different ways. In an embodiment, the camera may be a 2D camera capturing an exposure area that includes the pouch. Alternatively, in an embodiment, the camera may be a 1D camera, i.e. a line scanner. Such line scan camera may comprise a row of light-sensitive pixels, which constantly scan moving objects at a high line scan frequency. A two-dimensional image of an object can be generated with a line-scan camera if the object moves under the camera at a known speed. Data generated by a line scanner may be "stitched" together into a 2D image. The hyperspectral data acquired by an hyperspectral camera may have the form of a "data cube" 204 having a third dimension representing spectral response at different parts of the spectrum and two other dimensions (in the x and y direction) representing the spatial axis. In case of a line scanner, the y-axis may be a time respectively as shown in the figure.

Then, based on the groups of pixels, the blobs, that are localized in the one or more first images, blobs or parts of blobs in the hyperspectral image data may be selected. This way, hyperspectral data associated with pills localized in the one or more first images may be determined (step 205). Such hyperspectral blob may contain spectral values 206 for a localized medicament, e.g. a pill. These values may represent a spectrum 208 at a pixel location that is part of a medicine object. Based on the spectrum a fingerprint may be determined which can be compared with a reference fingerprint.

The high-resolution information in the high-resolution image allows fast and accurate distinction between the different medicaments in a pouch. Thus, based on a localized medicament in the high-resolution image, fast and accurate selection of hyperspectral image data associated with that localized medicament can be achieved. This information can then be used for selecting the relevant part of the data in the hyperspectral image data which is needed for real-time, high-throughput inspection.

FIG. 3 depicts a flow diagram of a method for inspecting medicine objects according to an embodiment of the invention. The process may include a first step 300 of capturing one or more first images of a first spatial resolution of the medicine pouch. In an embodiment, a camera system may be used comprising a high-resolution image sensor, e.g. a 1440×1080 pixel image sensor and an optical system providing a spatial resolution of 0.1 mm per pixel (or ~256 pixels per inch, PPI), preferably 0.08 mm per pixel (~317 PPI) or less. In an embodiment, the one or more images may be captured, while exposing the medicine packet to light of one or more parts of the electromagnetic spectrum. Here, at least one of the one or more first images may be an image that has a limited number of color channels, e.g. an RGB image. Further, at least one of the one or more first images may be an infrared IR or near-infrared NIR image. In a further embodiment, such images may be captured using and RGB camera or a RGBI camera wherein the "I" represents pixels forming an infrared or near-infrared NIR channel.

In a further step 302, the method may include capturing hyperspectral image data of the medicine packet. Here, a hyperspectral pixel of the hyperspectral image data may comprise a plurality of spectral values representing the near-infrared spectral response of the medicine packet at that pixel location (as described above with reference to FIG. 2). Here, captured spectral values of associated with one wavelength (a slice of the hyperspectral data stack) may form a 2D image of a second spatial resolution, wherein the second resolution is lower than the first resolution. Typically, the hyperspectral imaging system may have a pixelized image sensor and an optical system that provides a spatial resolution that is at least a factor 2 lower, e.g. 0.5 mm per pixel, than the pixel density associated with the first imaging system. Due to the low spatial resolution is more difficult to differentiate between different objects that are relatively close together. In an embodiment, during the capturing of the hyperspectral image data the medicine packet may be exposed to light of a continuous spectrum in the visible and/or near-infrared (NIR) part of the electromagnetic spectrum.

The process may further include determining one or more first blobs of first pixels, representing one or more medicaments, e.g. pills and/or capsules, in the one or more first images of the first spatial resolution (step 304). Then, one or more second blobs of second pixels may be selected from the hyperspectral image data based on the location of the one or more first blobs in the one or more first images (step 306). In step 308 a hyperspectral fingerprint for one of the one or more second pixel groups may be determined, wherein a hyperspectral fingerprint may be indicative of a spectral response of one or more chemical compounds in the medicine object. Thereafter, the hyperspectral fingerprint may be compared with a reference fingerprint to determine if the inspected medicine object can be identified as a medicine object according to the reference fingerprint (step 310).

Thus, in short, the method provides a very fast, efficient and accurate way of inspecting medicine objects based on capturing an image, such as color image, of one or more medicine objects and hyperspectral image data of the one or more medicine objects. Based on one or more medicine objects localized in a high spatial resolution image, one or more hyperspectral image data parts from the hyperspectral image data may be selected wherein the hyperspectral image data have a second spatial resolution that is lower than the first resolution. Thus, hyperspectral image data parts are determined based on the hyperspectral image data with high speed and accuracy. This way, hyperspectral pixels may be determined that are related to the medicine objects. The one or more hyperspectral image data parts may be subsequently used for determining one or more hyperspectral fingerprints, wherein a hyperspectral fingerprint is indicative of a spectral response of one or more chemical compounds in a medicine object. These one or more hyperspectral fingerprints are used to determine if the one or more medicine objects can be identified based on reference fingerprints.

Figure 4:
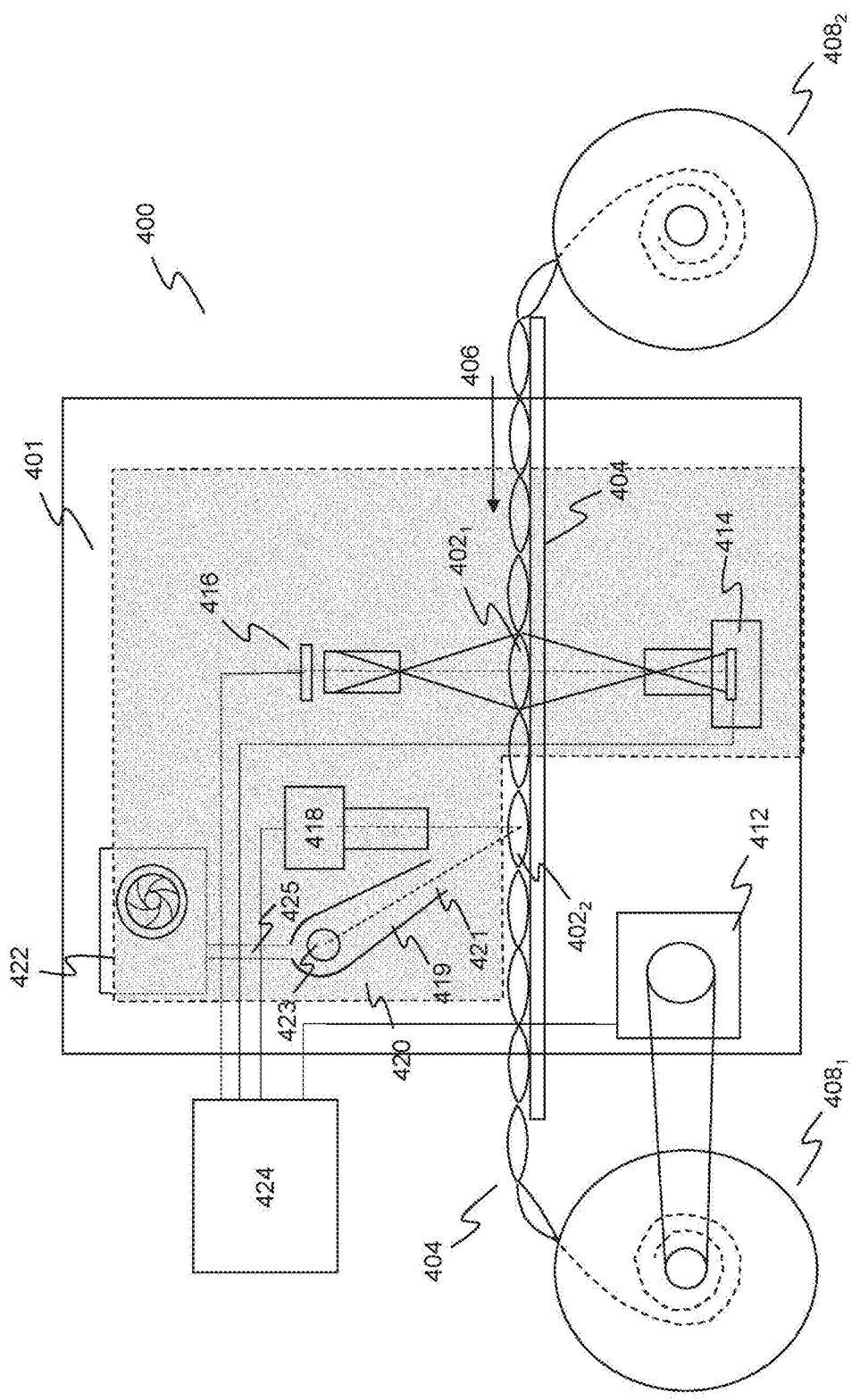
FIG. 4 depicts a medicine object inspection apparatus according to an embodiment of the invention.

FIG. 4 depicts a medicine inspection apparatus comprising a hyperspectral imaging system according to an embodiment of the invention. In particular, the figure depicts an inspection system 400 comprising an imaging system 401 for imaging one or more medicine objects $402_{1-n}$, i.e. one or more pouches comprising medicaments. The system may further comprise a transport structure 404 comprising a transporting path 406 for guiding one or more medicine objects through an inspection area of the imaging system. The medicine objects may include pills, tablets, capsules, ampules, etc. or a packet or pouch comprising such pills, tablets, capsules, ampules, etc., which are inspected based on image data generated by the imaging system. When the inspection system is in use, the medicine objects may be transported over the transport path to the inspection area. In an embodiment, the medicine objects may be configured as a string of packets that can be unwound from a first (upstream) reel $408_2$, guided through the inspection area and rewound around a second (downstream) reel $408_1$. The movement of the reels may be controlled by a motor 412.

Depending on the implementation, the imaging system may comprise one or more camera systems. For example, in an embodiment, the imaging system may comprise a camera system 414, 416 comprising one or more multi-spectral image sensors which are configured to capture images of the packets, based on a (limited) number of color channels. For example, an image system may include RGB pixels for capturing an RGB color image or three images for each color channel. Additionally, the image system may include one or more further spectral channels, e.g. a spectral channel in the near-infrared (NIR).

In another embodiment, the imaging system may comprise a hyperspectral camera system according to any of the embodiments in this application. The hyperspectral camera system may include a hyperspectral camera 418 and a lamp 420 for illuminating an imaging area of the hyperspectral camera. In an embodiment, the lamp may include a housing 419 and an illumination source 423. At one side, the housing may include an aperture 421 allowing light to exit the housing and illuminate a medicine object. Typically, the illumination source may be configured to generate light of a continuous spectrum such as a halogen lamp or the light. Typically, such illumination sources generate a large amount of heat. Therefore, in some embodiment, the housing may include an outlet 425 which may be connected to a cooling system 422, e.g. an air cooling system. This way, an flow, e.g. an air flow, can be generated wherein heat is transported away from the aperture towards the outlet. This way, it may be avoided that the heat produced by the illumination sources increases the temperature of its surroundings. The inspection system may be controlled by a controller 424, e.g. a computer, that comprises different modules, e.g. software and/or hardware modules, configured to control the processes that are needed for inspecting the medicine objects.

In an embodiment, the hyperspectral camera may be configured to detect the spectral response of an imaged area in the near-infrared (NIR) part of the spectrum. In some embodiments, the hyperspectral camera may also be configured to detect the spectral response of an imaged area in the visible part of the spectrum. In that case, the hyperspectral camera may generate image data both in the visible range and in the NIR range.

Hence, per camera pixel, a plurality of spectral values, preferably 100 or more spectral values, may be detected in the near-infrared band, e.g. between 900 and 1700 nm and/or the visible band. Hence, each spectral value represents a spectral response of an object, e.g. a medicament, that is imaged by the hyperspectral imaging system.

Pictures generated by the first and second camera system may be processed by an image processing module that is executed by the controller 424. For example, image data of the first camera system, e.g. 2D color pictures such as RGB color pictures, may be analyzed using an image processing algorithm which is configured to localize and recognize medicine objects in the picture based on features such as shape and/or color. Similarly, image data of the second camera system, e.g. a 3D stack of image data comprising spectral information on medicine objects, preferably near infrared spectral information, may be used to determine a fingerprint of a medicine object, which may be compared with reference fingerprints in a database in order to derive information about the composition of the medicine object.

The hyperspectral camera may be implemented in different ways. For example, in an embodiment, the camera may be a 2D imager. In another embodiment, the camera may be implemented as a line scanner. In case of a 2D imager, the camera may comprise a 2D grid of light sensitive pixels configured to generate 2D hyperspectral image data. The 2D hyperspectral image data may include pixels of the imaged area, wherein each pixel is associated with a plurality of spectral response values. In case of a line-scan camera, the camera may comprise a row of light-sensitive pixels, which scans an area at a high line scan frequency to produce 1D hyperspectral image data for each scan. A two-dimensional image of an object can be generated with a line-scan camera if the object moves under the camera at a known speed or if the camera moves over the object at a known speed. In that case, the 1D hyperspectral image data (a line of pixel data, wherein each pixel data includes a plurality of spectral values) that is generated by the line-scanner may be "stitched" together into 2D hyperspectral image data that include pixels of the imaged area, wherein each pixels is associated with a plurality of spectral response values. Thus, the data acquired by the hyperspectral cameras may have the form of a "data cube" having a third dimension representing spectral response at different parts of the spectrum and two other dimensions (in the x and y direction) representing the spatial axis and time, respectively.

In an embodiment, the hyperspectral camera may be configured to generate spectral values in at least the near infrared (NIR) range (wavelengths selected approximately between 900 nm and 1700 nm) of the electromagnetic spectrum. In other embodiments, the hyperspectral camera may be configured to generate spectral values both in the NIR range and in the visible range or only in the visible range. Further, a typical data acquisition of a line-scanner may correspond to a "line" of 600 to 1000 pixels with length approximately between 200 and 300 μm each. The width of the pixel varies according to the field of view of the lens but in our case is approximately between 300 and 600 μm. Every such spatial pixel may comprise more than 200 spectral values spread equidistantly in the 900-1700 nm bandwidth. It is submitted that this figure is merely a non-limiting example of a hyperspectral imaging system that may be used in a medicine inspection system according to the various embodiments described in this application.

The motor, e.g. a stepper motor, that drives the transport structure (e.g. a conveyor belt) may serve as the triggering mechanism for the camera. At each step of the motor the camera may be triggered to acquire a line of pixels. The conveyor belt may be controlled at a speed of 100-200 mm/sec, which would trigger the hyperspectral camera around 300 times per second, so the object is scanned with 300 fps. That means a maximum of 3.3 ms between the acquisition of two consecutive lines and therefore a maximum exposure time not longer than 3 ms, taking into account the time needed to transport the data.

The processing of the hyperspectral data may comprise a step of identifying in the hyperspectral image data, data that are related to specular reflections and overexposed areas (at the packet level) and removing the identified hyperspectral data. Then, in a further step hyperspectral fingerprint(s) (at the pill level) may be determined, wherein each detected medicine object (pill, capsule, tablet) may be represented by a blob on the x-y plane of the hyperspectral cube. Overexposed pixels and/or pixels that are contaminated from specular reflections may be detected so that these values can be excluded from the computation of hyperspectral fingerprints. The detection of pixel values that have been overexposed during acquisition may be based on threshold values. For example, in an embodiment, overexposure may be determined if the reflectance signal equals the maximum of the dynamic range of the sensor. These pixels may be filtered out of the raw data easily since their reflectance values are equal to the maximum of the dynamic range across all spectral bands.

Figure 6:
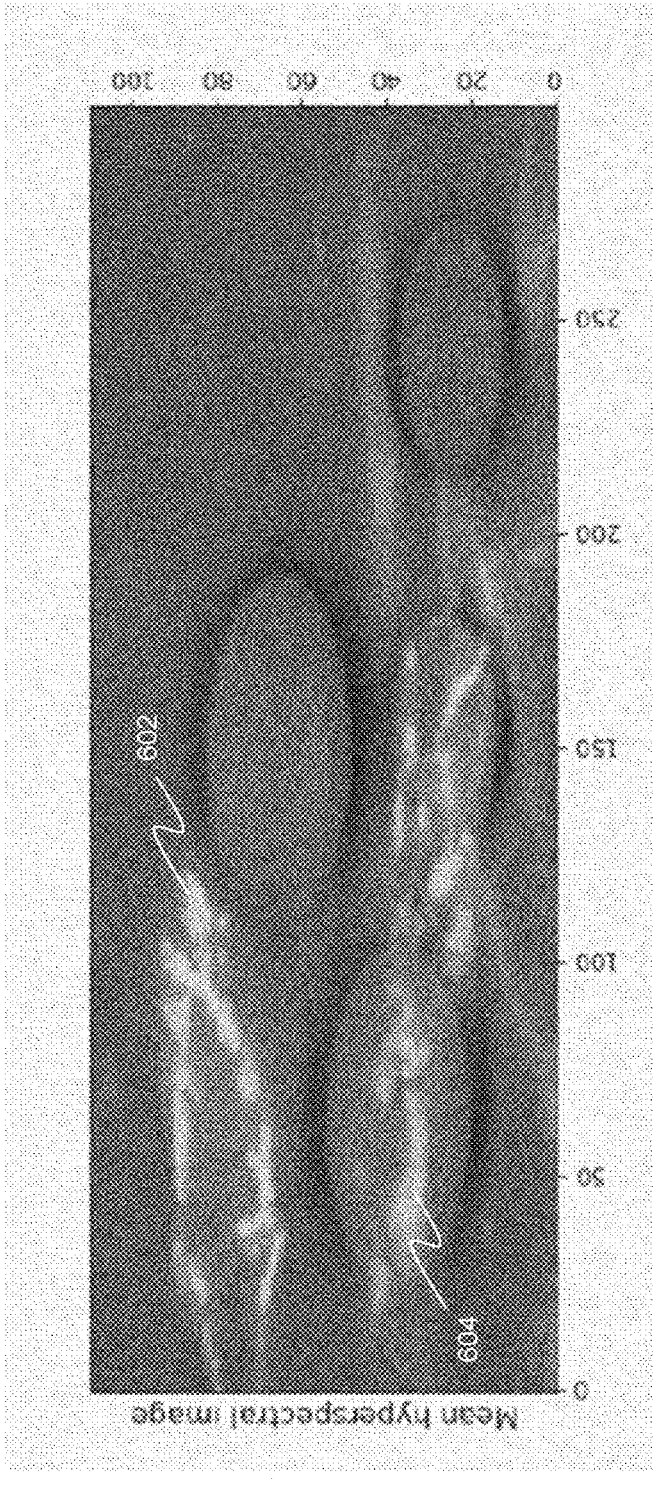
FIG. 6 depicts an example of an image of a medicine packet captured by a hyperspectral imaging system.

Pixels that are contaminated by specular reflections, mostly reflect the light back to the camera like a mirror, rendering the underlying object invisible. FIG. 6 shows such reflections (white regions as e.g. indicated by references 602 and 604) on a hyperspectral scan of a pouch where the pill inside the pouch is not visible because of reflections of the pouch. The reflectance spectrum in those regions may be essentially equivalent to the spectral power distribution of the light source itself (SPD), which is equivalent to the reflection of the total amount of light emitted.

Figure 7:
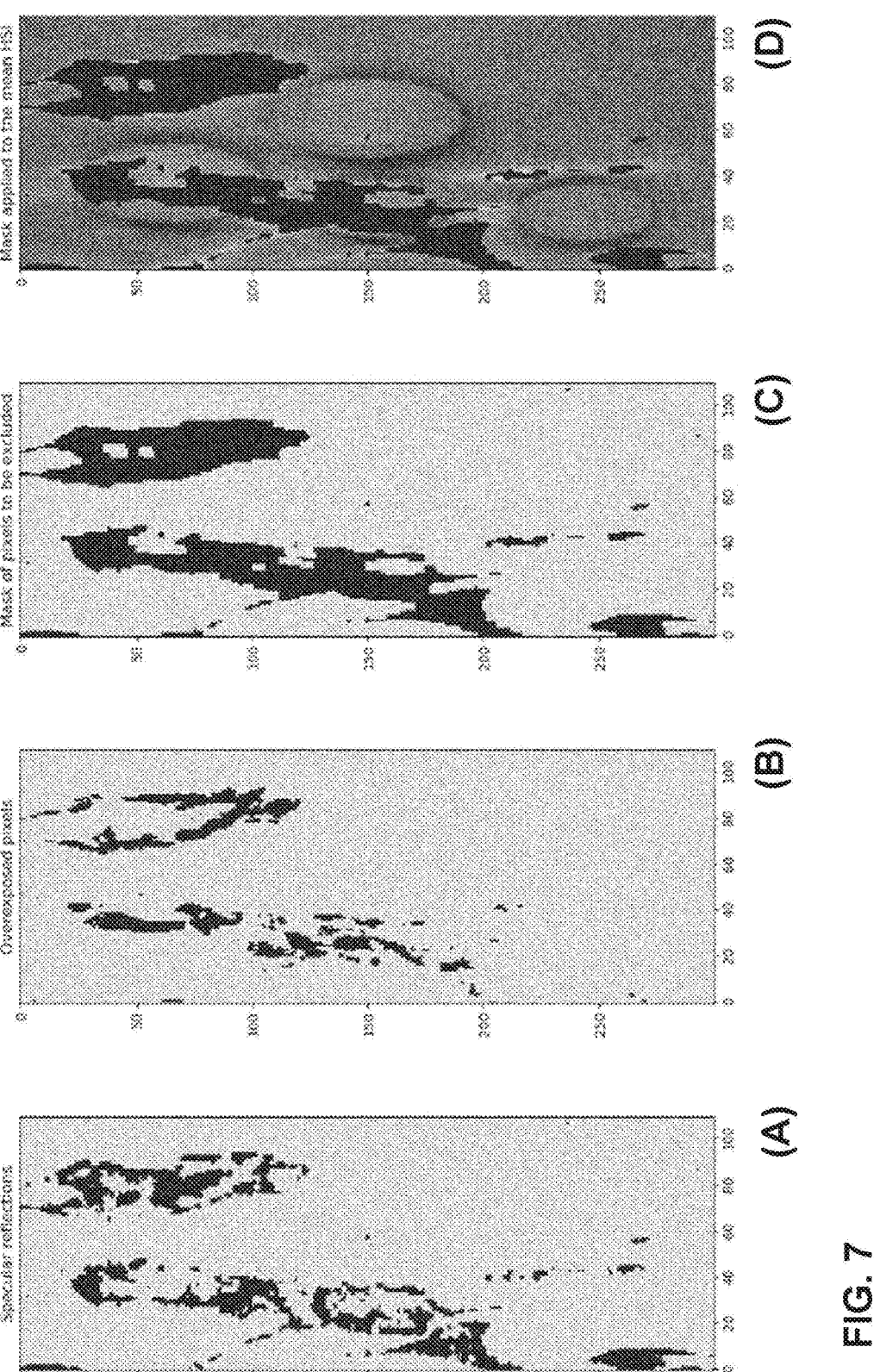
FIG. 7A-7D depict images processed based on image processing methods according to the embodiments in this application.

Known algorithms may be used to detect such regions. For example an target detection technique such as the Constrained Energy Minimization (CEM) technique may be used to detect such regions. CEM is a finite impulse response filter designed to maximize the response of a known target profile and at the same time suppress the response of the composite unknown background, thus matching only the known target spectra. The target spectra may be the SPD of the light source, which may be approximated based on the reflection of a white calibration target that has >95% reflectance grade across the whole spectrum. The composite unknown background may be expressed as a correlation or covariance matrix of all pixels on the x-y plane, giving the CEM detector the following mathematical formulation:

$$T_{CEM} = \frac{d^T R^{-1} x}{d^T R^{-1} d}$$

where d is the light source of the target profile, x is the spectrum of a single pixel, and R is the composite background correlation or covariance matrix. FIG. 7A-7D schematically show the process of detection of specular reflections and overexposed pixels and the subsequent removal of these pixels from the hyperspectral image data as shown in FIG. 6. Here, in FIG. 7A specular reflections are detected based on a target detection technique as described above. Similarly, in FIG. 7B overexposed pixels may be determined based on a threshold value. Then, both the pixels affected by specular reflections and overexposure may be used to form a pixel mask as shown in FIG. 7C, identifying pixels (and associated spectral values) that should be removed from the spectral image data. FIG. 7D depicts the result wherein the pixel mask is applied to the hyperspectral image data. Based on these data hyperspectral fingerprints may be determined.

The extraction of a hyperspectral fingerprint of individual medicine objects inside a pouch may comprise a first step of localization of a medicament, e.g. a pill, in one or more high resolution images of a medicine pouch. The image processing of these images that precedes the hyperspectral processing may already provide a robust pill detection and segmentation. The contours of a detected blob representing a medicament may be used to localize medicine objects inside the pouch. The resolution and the pixel size of the high-resolutin image may be different compared to those of the hyperspectral image, so the contour coordinates need to be scaled so that it can be used to localize blobs of pixels in the hyperspectral data (hyperspectral blobs) representing medicine objects. The scaling coefficients may be constant for every pouch which results in a very fast computation of the coordinates of the tablet on the x-y plane of the hyperspectral image.

Then, outliers (background pixels) may be removed from in the hyperspectral blobs. The hyperspectral blobs may comprise background pixels because the mapping of coordinates from the high resolution image to the hyperspectral image may not be exact. Additionally, the position of a pouch or a medicine object in the pouch may change slightly when being transported from the color camera exposure area to the exposure area of the hyperspectral camera. In such cases using all the pixels designated by this mapping would result in some background pixels being taken into account in the computation of the medication fingerprint. In order to solve that problem, selected hyperspectral image data may be clustered in two groups according to their spectral characteristics. To this end, in an embodiment, a clustering algorithm such as a k-means clustering algorithm with k=2 clusters may be used for each blob separately. In an embodiment, the centroids of the two clusters may be defined as the spectral mean of the whole pouch, representing the background cluster and the center of mass of the mapped blob, representing the medicine objects. After execution of the clustering algorithm, the pixels assigned to the medication cluster may be used for all subsequent computations.

A further step relates to the de-noising and normalization of pixels in the hyperspectral blob. For the remaining valid pixels, the thermal noise of the camera may be subtracted. This may be realized based on the raw reflectance values. This noise is essentially the signal received by the sensor when the shutter of the camera is closed (complete absence of light). To obtain a robust measurement of the noise, plurality of scans with the shutter closed may be taken and the values for each wavelength may be averaged. The thus obtained average noise profile may be subtracted from the reflectance of each individual pixel. Subsequently spectral characteristics of the light source may be removed. This is done to ensure that only the reflectance characteristics of the medicine objects are used in the determination of a fingerprint. This may be realized by dividing the reflectance values of every pixel by the average reflectance of the aforementioned white calibration target.

For every pixel a logarithmic derivative may be computed to make the hyperspectral fingerprints invariant to the light intensity. The logarithmic derivative of a spectrum p at the spectral band i can be computed as:

$$ds_i = \frac{p_i}{p_{i+1} + \epsilon} - 1$$

where $\epsilon$ is a small positive constant that ensures that division by zero does not occur. This form of derivative is called logarithmic because it uses the ratio between consecutive spectra instead of their difference. The logarithmic derivative may accentuate small structural differences between nearly identical spectra. The log-derivatives of the spectra may be smoothed with a filter, e.g. a Savitzky-Golay filter, that performs a piece-by-piece fitting of a polynomial function, e.g. second degree polynomial function to the input signal. The mean of the smoothed logarithmic derivatives of all the valid pixels for each spectral bin may be computed, thus reducing the data to a single reflectance spectrum per medication and averaging out noise.

At this stage, a medication object may be represented by a vector of predetermined dimensions, e.g. 150 dimensions of more. Each dimension may correspond to a different wavelength in the range 930-1630 nm and it may be possible that a number of wavelengths carry no significant discriminative power among different medicine objects. Such redundant dimensions do not contribute anything to successfully matching medications and in fact they often reduce the performance of a matching algorithm In order to obtain the smallest number of dimensions carrying the maximum amount of discriminative information a dimensionality reduction algorithm such as a PCA dimensionality reduction algorithm may be used. Such algorithm may be used to detect the non-linear structures in the original data and unfolds them to linearly separable projections. In an embodiment, a cosine kernel may be used, which essentially means that the data is projected to a new feature space based on the matrix of pairwise cosine distances among the hyperspectral profiles in a reference set. This step may require to define a set of reference pouches beforehand, as it is this set that is used to compute the Kernel PCA transformation. The broader and more complete the set of reference pouches is the more robust the Kernel PCA model will be, especially for small numbers of reference patches. After a certain number of pouches, the projections of the feature space "learned" by the Kernel PCA algorithm hardly change, but that number is estimated at several hundred pouches.

FIG. 5 depicts a method for processing hyperspectral image data according to an embodiment of the invention. Examples of images during the image processing are depicted in FIG. 8A-8D and FIG. 9 and FIG. 10. In particular, this figure depicts a method for processing hyperspectral image data based on the steps as described above. The method may include a step to capture an image of a first spatial resolution of a medicine packet and localize one or more medicine objects in the image and to capture hyperspectral image data from the medicine packet (step 500). Then, a number of image processing steps may be applied to the hyperspectral data. These steps may include removal of background pixels (outliers) from the one or more hyperspectral image data parts using an algorithm, such as a clustering algorithm (step 502). Further, the method may comprise a step of removing pixels that are contaminated with specular reflections and/or that are overexposed from the one or more hyperspectral image data (step 504).

Figure 8:
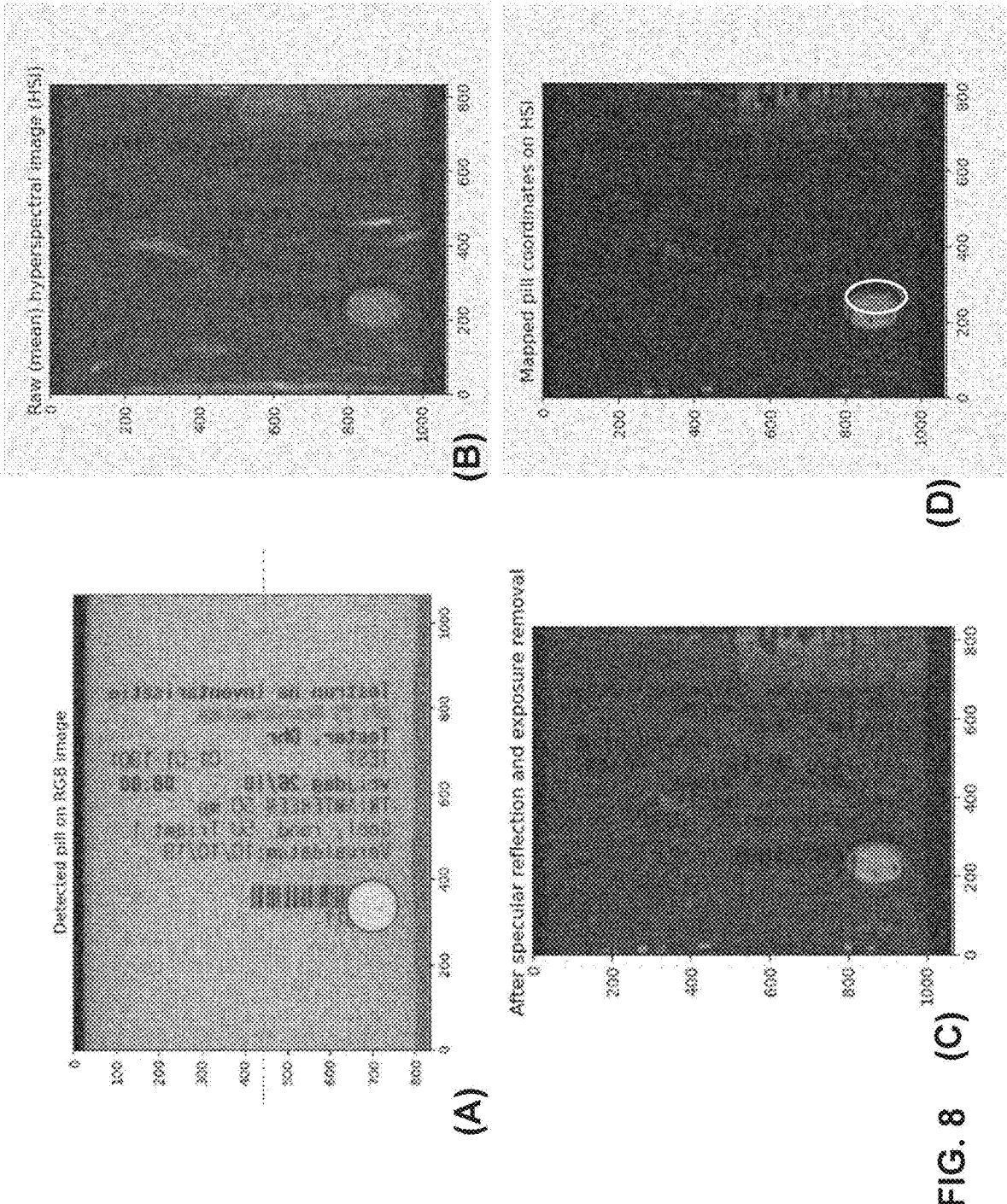
FIG. 8A-8D depict images processed based on image processing methods according to the embodiments in this application.

FIG. 8A depicts an example of a localized pill in a color image. Similarly, FIG. 8B depicts a hyperspectral image of the pill and FIG. 8C depicts an image in which pixels comprising specular reflections and overexposure are removed. Then one or more hyperspectral image data parts may be determined by mapping the one or more localized medicine objects in the image onto the hyperspectral image data (step 506). This step is illustrated by FIG. 8D which depicts the selection of a blob of pixels from the hyperspectral image data based on the pill that is localized in the color image. In a further step the dimension of the one or more hyperspectral image data parts may be reduced, preferably based on a PCA method (step 508). A fingerprint may be determined based on at least one of the one or more reduced hyperspectral image data parts (step 510).

Figures 9, 10:
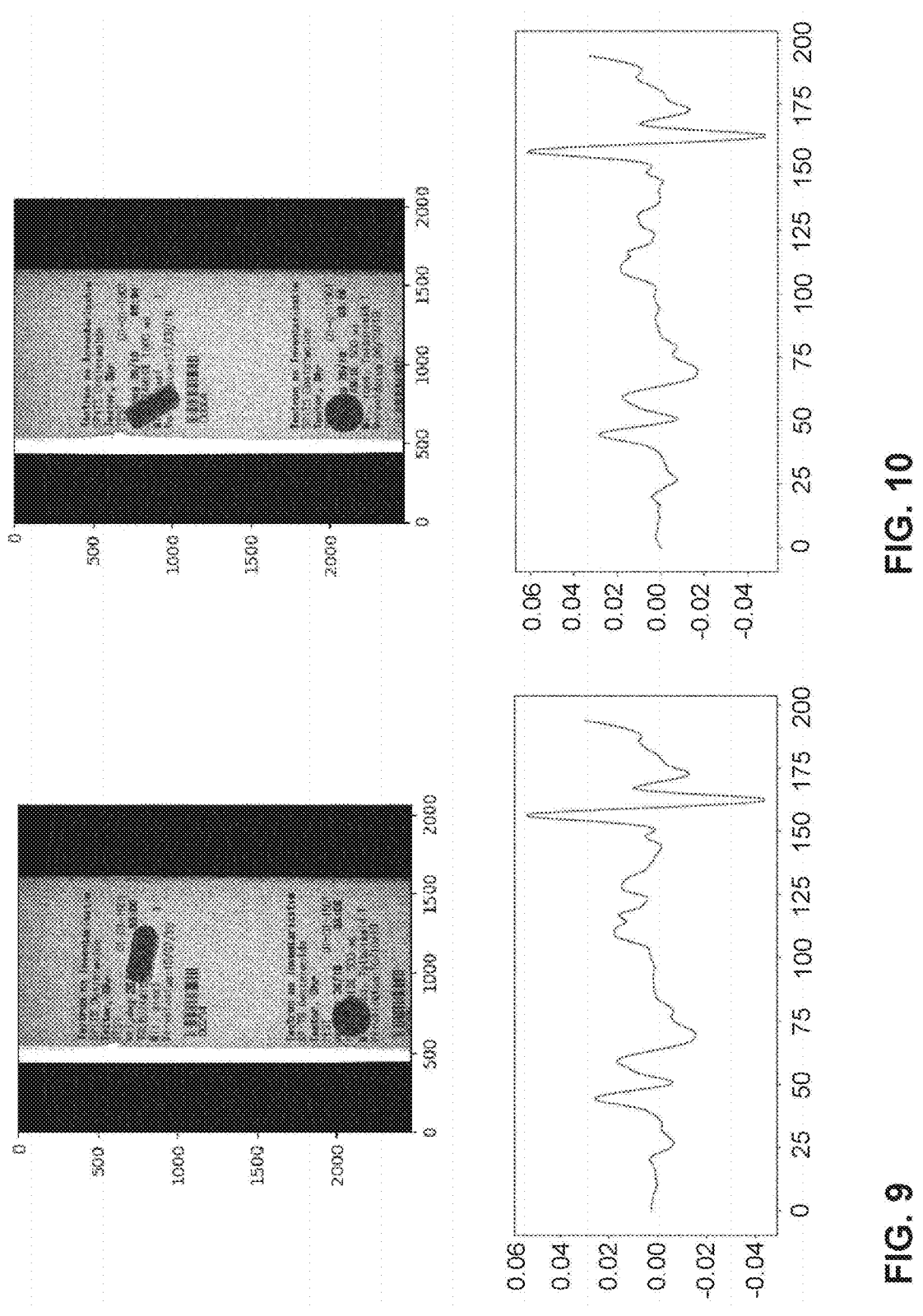
FIGS. 9 and 10 show images of medicine pouches and fingerprints of medicine objects.

FIGS. 9 and 10 depict examples of fingerprints of two pills of the same pharmaceutical composition, wherein the fingerprints are computed based on the data processing steps described with reference to the embodiments in this disclosure. These results show that the process provides reliable and reproducible results allowing accurate inspection of medicine objects.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of inspecting medicine objects comprising:
capturing an image of medicine objects randomly arranged in a pouch, the image having a first spatial resolution;
capturing hyperspectral image data of the medicine objects in the pouch, the hyperspectral image data having a second spatial resolution smaller than the first spatial resolution;
determining blobs of pixels in the image of the first spatial resolution, each of the blobs of pixels representing one of the medicine objects;
selecting at least one hyperspectral image data part from the hyperspectral image data based on at least one of the blobs of pixels in the image of the first spatial resolution;
determining a hyperspectral fingerprint based on the hyperspectral image data part, the hyperspectral fingerprint being indicative of a spectral response of one or more chemical compounds in a medicine object; and,
comparing the hyperspectral fingerprint with one or more reference fingerprints.

2. The method according to claim 1, wherein the capturing of the hyperspectral image data includes exposing the one or more medicine objects to light having a continuous spectrum.

3. The method according to claim 1, wherein the hyperspectral data include a grid of pixels, each pixel being associated with a plurality of spectral values, each spectral value being associated with a wavelength in a visible and/or near-infrared region of the electromagnetic spectrum.

4. The method according to claim 1 wherein the image of one or more medicine objects includes a 2D grid of pixels of the first spatial resolution, each pixel being associated with at least one spectral value.

5. The method according to claim 1 wherein the hyperspectral image data include line-scan hyperspectral image data, the line-scan hyperspectral image data including lines of pixels, wherein each pixel is associated with a plurality of spectral values.

6. The method according to claim 1 wherein determining one or more blobs of pixels in the image is based on an object detection and segmentation algorithm.

7. The method according to claim 1 wherein selecting one or more hyperspectral image data parts includes:
mapping one or more blobs of pixels in the image onto pixels of the hyperspectral image data.

8. The method according to claim 1 wherein prior to the selecting one or more hyperspectral image data parts, executing one or more of the following steps:
removing background pixels (outliers) from the one or more hyperspectral image data using an algorithm, preferably a clustering algorithm;
removing pixels that are contaminated with specular reflections and/or that are overexposed from the one or more hyperspectral image data.

9. The method according to claim 1 wherein the determining one or more hyperspectral fingerprints further comprises:
reducing a dimension of the one or more hyperspectral image data parts; and,
determining a fingerprint based on at least one of the one or more reduced hyperspectral image data parts.

10. The method according to claim 1 wherein a camera system is used to capture the image of one or more medicine objects.

11. The method according to claim 1 wherein the hyperspectral image data are captured using a 2D hyperspectral camera or a hyperspectral line scan camera, wherein during the capturing, the medicine object moves relative to the hyperspectral line scan camera.

12. A module for controlling a medicine inspection apparatus comprising a camera system, the module comprising a non-transitory computer readable storage medium having computer readable program code embodied therewith, and a processor coupled to the non-transitory computer readable storage medium, wherein responsive to executing the computer readable program code, the processor is configured to perform executable operations comprising: capturing an image of medicine objects randomly arranged in a pouch, the image having a first spatial resolution; capturing hyperspectral image data of the medicine objects in the pouch, the hyperspectral image data having a second spatial resolution smaller than the first spatial resolution; determining blobs of pixels in the image of the first spatial resolution, each of the blobs of pixels representing one of the medicine objects; selecting at least one hyperspectral image data part from the hyperspectral image data based on at least one of the blobs of pixels in the image of the first spatial resolution; determining a hyperspectral fingerprint based on the hyperspectral image data part, the hyperspectral fingerprint being indicative of a spectral response of one or more chemical compounds in a medicine object; and, comparing the hyperspectral fingerprint with one or more reference fingerprints.

13. A medicine object inspection apparatus comprising: a camera system, a non-transitory computer readable storage medium having at least part of a program embodied therewith; and, a non-transitory computer readable storage medium having computer readable program code embodied therewith, and a processor coupled to the non-transitory computer readable storage medium, wherein responsive to executing the computer readable program code, the processor is configured to perform executable operations comprising: capturing an image of medicine objects randomly arranged in a pouch, the image having a first spatial resolution; capturing hyperspectral image data of the medicine objects in the pouch, the hyperspectral image data having a second spatial resolution smaller than the first spatial resolution; determining blobs of pixels in the image of the first spatial resolution, each of the blobs of pixels representing one of the medicine objects; selecting at least one hyperspectral image data part from the hyperspectral image data based on at least one of the blobs of pixels in the image of the first spatial resolution; determining a hyperspectral fingerprint based on the hyperspectral image data part, the hyperspectral fingerprint being indicative of a spectral response of one or more chemical compounds in a medicine object; and, comparing the hyperspectral fingerprint with one or more reference fingerprints.

14. Computer program product comprising software code portions configured for, when run in a non-transitory memory of a computer, executing the method according to claim 1.

15. The method of claim 1, wherein the medicine objects comprise medicaments of different shapes, sizes and/or compositions.

16. The method of claim 2, wherein the continuous spectrum is in a visible and/or near-infrared region of the electromagnetic spectrum.

17. The method of claim 4, wherein the at least one spectral value comprises a RGB value and/or an IR value.

18. The method of claim 8, wherein the algorithm is a clustering algorithm.

19. The method of claim 9, wherein reducing the dimension of the one or more hyperspectral image data parts is based on a PCA method.

20. The method of claim 11, wherein the medicine object moves through a field of view of the camera system.

\*    \*    \*    \*    \*